United States Patent
He et al.

(10) Patent No.: US 11,664,871 B2
(45) Date of Patent: May 30, 2023

(54) METHODS AND APPARATUS FOR UE INITIATED BEAM REPORTING

(71) Applicant: QUALCOMM Incorporated, San Diego, CA (US)

(72) Inventors: Ruhua He, San Diego, CA (US); Amir Aminzadeh Gohari, Sunnyvale, CA (US); Raghu Narayan Challa, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 16/883,416

(22) Filed: May 26, 2020

(65) Prior Publication Data

US 2020/0389221 A1    Dec. 10, 2020

Related U.S. Application Data

(60) Provisional application No. 62/859,668, filed on Jun. 10, 2019.

(51) Int. Cl.
*H04B 7/06* (2006.01)
*H04W 24/10* (2009.01)
(Continued)

(52) U.S. Cl.
CPC ......... *H04B 7/0695* (2013.01); *H04B 7/0626* (2013.01); *H04W 16/28* (2013.01);
(Continued)

(58) Field of Classification Search
CPC ... H04B 7/0695; H04B 7/0626; H04W 24/10; H04W 76/28; H04W 52/0225;
(Continued)

(56) References Cited

U.S. PATENT DOCUMENTS 10,863,570 B2 * 12/2020 Cirik ..................... H04B 7/088
2017/0251518 A1   8/2017 Agiwal et al.
(Continued)

OTHER PUBLICATIONS

Huawei, et al., "Consideration on Beam Management with C-DRX", 3GPP TSG-RAN WG2 Meeting #98; R2-1704863 Beam Management with DRX, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017, (May 14, 2017), 4 Pages, XP051275378, From Internet: URL: http://www.3gpp.org/ftp/Meetings_3GPP_SYNC/RAN2/Docs/ [retrieved on May 14, 2017] line 9, paragraph 2-line 20, line 27, paragraph 2-line 28, figure 1, paragraph [0004].
(Continued)

*Primary Examiner* — Afshawn M Towfighi
(74) *Attorney, Agent, or Firm* — Procopio, Cory, Hargreaves & Savitch LLP

(57) ABSTRACT

The present disclosure relates to transmitting and receiving a beam report at a UE and a base station. The base station can configure a cDRX cycle with the UE. Also, the UE can wake up during an off period of the cDRX cycle. The UE can also compare a first metric of at least one of a plurality of candidate beams and a second metric of a current beam for communication with the base station. Additionally, the UE can transmit a beam report to the base station, during the off period, based on the comparison of the first metric of the at least one of the plurality of candidate beams and the second metric of the current beam. The UE can also select, during the off period of the cDRX cycle, the at least one of the plurality of candidate beams for communication with the base station.

27 Claims, 12 Drawing Sheets

(51) Int. Cl.
*H04W 76/28* (2018.01)
*H04W 52/02* (2009.01)
*H04W 80/02* (2009.01)
*H04W 16/28* (2009.01)
*H04W 72/50* (2023.01)

(52) U.S. Cl.
CPC ....... *H04W 24/10* (2013.01); *H04W 52/0225* (2013.01); *H04W 72/535* (2023.01); *H04W 76/28* (2018.02); *H04W 80/02* (2013.01)

(58) Field of Classification Search
CPC . H04W 72/1257; H04W 80/02; H04W 16/28; H04W 76/19; H04W 4/00; H04W 4/80; H04W 4/70; Y02D 30/70
See application file for complete search history.

(56) References Cited

U.S. PATENT DOCUMENTS

| | | | |
|---|---|---|---|
| 2018/0167883 A1* | 6/2018 | Guo | H04W 72/046 |
| 2018/0343045 A1* | 11/2018 | Muruganathan | H04B 7/0619 |
| 2018/0368169 A1* | 12/2018 | Jung | H04L 1/1861 |
| 2019/0058561 A1* | 2/2019 | Ho | H04B 7/088 |
| 2019/0059129 A1* | 2/2019 | Luo | H04W 72/042 |
| 2019/0068268 A1* | 2/2019 | Zhang | H04W 76/27 |
| 2019/0110300 A1* | 4/2019 | Chen | H04W 72/542 |
| 2020/0014517 A1* | 1/2020 | Takeda | H04L 5/0007 |
| 2020/0112355 A1* | 4/2020 | Park | H04B 7/0626 |
| 2020/0163071 A1* | 5/2020 | Gao | H04B 7/088 |

OTHER PUBLICATIONS

Interdigital Communications: "C-DRX Beam Management Aspects", 3GPP Draft; R2-1701187 (NR SI AI10214) C-DRX Beam Management Aspects, 3rd Generation Partnership Project (3GPP), Mobile Competence Centre; 650, Route Des Lucioles; F-06921 Sophia-Antipolis Cedex; F, vol. RAN WG2, No. Athens, Greece; Feb. 13, 2017-Feb. 17, 2017, (Feb. 4, 2017), pp. 1-3, XP051223410, Feb. 12, 2017, retrieved on Feb. 12, 2017, From Internet: URL: http://www.3gpp.org/ftp/tsg_ran/WG2_RL2/TSGR2_97/Docs/ [retrieved on Feb. 4, 2017] p. 2/1, line 21-line 28.
International Search Report and Written Opinion—PCT/US2020/034748—ISA/EPO—dated Sep. 16, 2020.

* cited by examiner form as a prelude to the more detailed description that is presented later.

METHODS AND APPARATUS FOR UE INITIATED BEAM REPORTING

CROSS REFERENCE TO RELATED APPLICATION(S)

This application claims the benefit of U.S. Provisional Application Ser. No. 62/859,668, entitled "METHODS AND APPARATUS FOR UE INITIATED BEAM REPORTING" and filed on Jun. 10, 2019, which is expressly incorporated by reference herein in its entirety.

BACKGROUND

Technical Field

The present disclosure relates generally to communication systems, and more particularly, to methods and devices for transmitting and/or receiving communications including a beam report.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus can wake up during an off period of a connected mode discontinuous reception (cDRX) cycle. Also, the apparatus can measure a metric of each of the plurality of candidate beams for communication with a base station. The apparatus can also compare a first metric of at least one of a plurality of candidate beams and a second metric of a current beam for communication with the base station. Additionally, the apparatus can transmit a beam report to the base station, during the off period, based on the comparison of the first metric of the at least one of the plurality of candidate beams and the second metric of the current beam. The apparatus can also transmit a scheduling request (SR) during the off period and prior to transmitting the beam report, where the SR can be transmitted using a preconfigured, periodic SR uplink control channel resource. Further, the apparatus can select, during the off period of the cDRX cycle, the at least one of the plurality of candidate beams for communication with the base station. The apparatus can also generate the beam report during the off period of the cDRX cycle based on the comparison of the first metric of the at least one of the plurality of candidate beams and the second metric of the current beam.

In another aspect of the disclosure, a method, a computer-readable medium, and an apparatus are provided for wireless communication. The apparatus can configure a cDRX cycle with a user equipment (UE). The apparatus can also receive a beam report from the UE during an off period of the cDRX cycle based on a preconfigured resource, where the beam report can include a comparison of a first metric of at least one of a plurality of candidate beams and a second metric of a current beam. Additionally, the apparatus can switch to the at least one of the plurality of candidate beams from the current beam, during the off period, for communication with the UE in a following on period. The apparatus can also configure a physical uplink control channel (PUCCH) for communication with the UE during the off period. The apparatus can also receive a SR during the off period and prior to receiving the beam report, where the SR can be received using a preconfigured, periodic SR uplink control channel resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
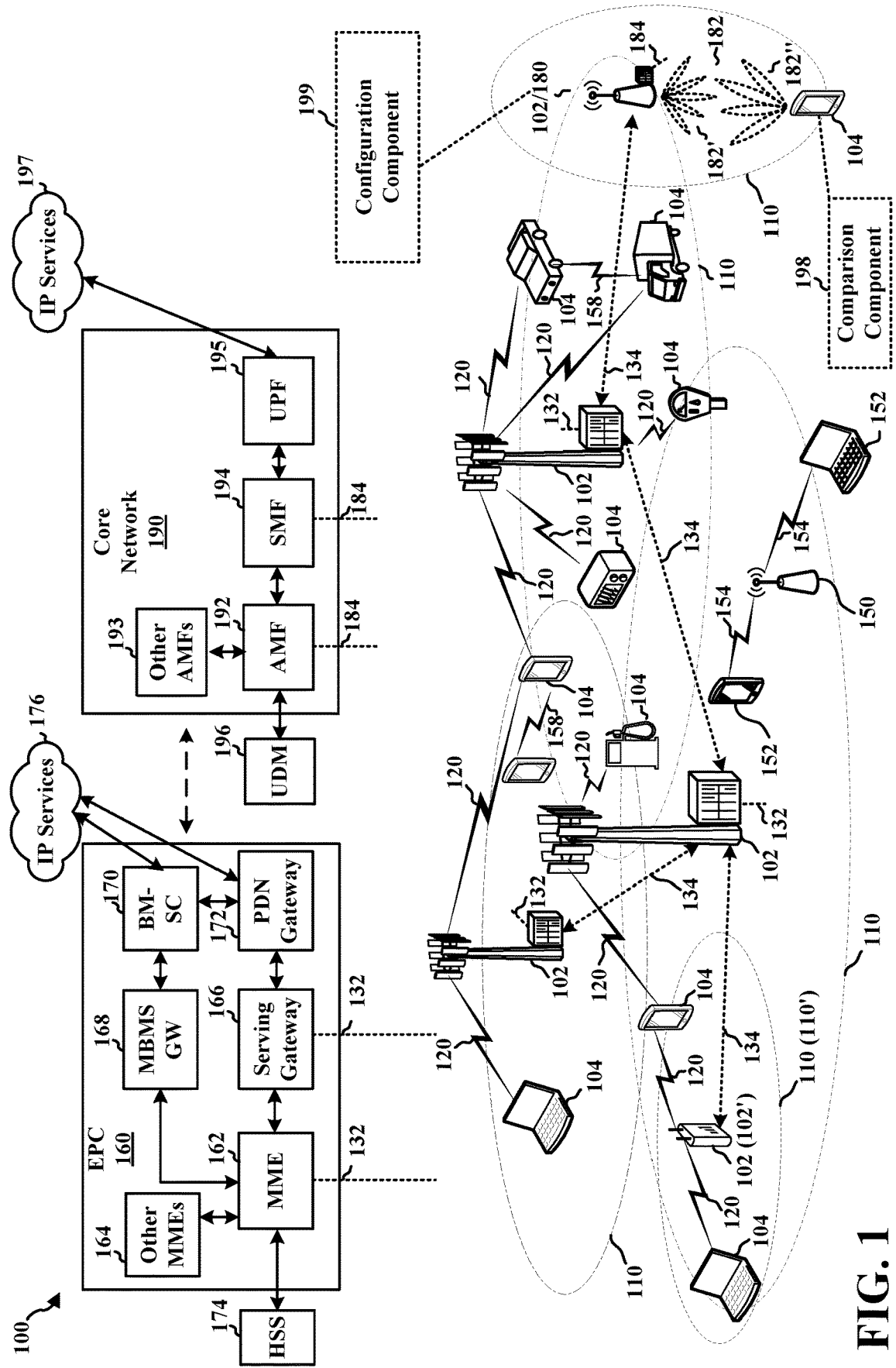
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a comparison component 198 configured to wake up during an off period of a connected mode discontinuous reception (cDRX) cycle. The comparison component 198 may also be configured to compare a first metric of at least one of a plurality of candidate beams and a second metric of a current beam for communication with a base station. The comparison component 198 may also be configured to transmit a beam report to the base station, during the off period, based on the comparison of the first metric of the at least one of the plurality of candidate beams and the second metric of the current beam. The comparison component 198 may also be configured to transmit a scheduling request (SR) during the off period and prior to transmitting the beam report, where the SR can be transmitted using a preconfigured, periodic SR uplink control channel resource. Further, the comparison component 198 may be configured to select, during the off period of the cDRX cycle, the at least one of the plurality of candidate beams for communication with the base station. The comparison component 198 may also be configured to generate the beam report during the off period of the cDRX cycle based on the comparison of the first metric of the at least one of the plurality of candidate beams and the second metric of the current beam.

Additionally, the base station 102/180 may include a configuration component 199 configured to configure a cDRX cycle with a UE. The configuration component 199 may also be configured to receive a beam report from the UE during an off period of the cDRX cycle based on a preconfigured resource, where the beam report can include a comparison of a first metric of at least one of a plurality of candidate beams and a second metric of a current beam. Additionally, the configuration component 199 may be configured to switch to the at least one of the plurality of candidate beams from the current beam, during the off period, for communication with the UE in a following on period. The configuration component 199 may also be configured to configure a physical uplink control channel (PUCCH) for communication with the UE during the off period. The configuration component 199 may also be configured to receive a SR during the off period and prior to receiving the beam report, where the SR can be received using a preconfigured, periodic SR uplink control channel resource.

Figure 2:
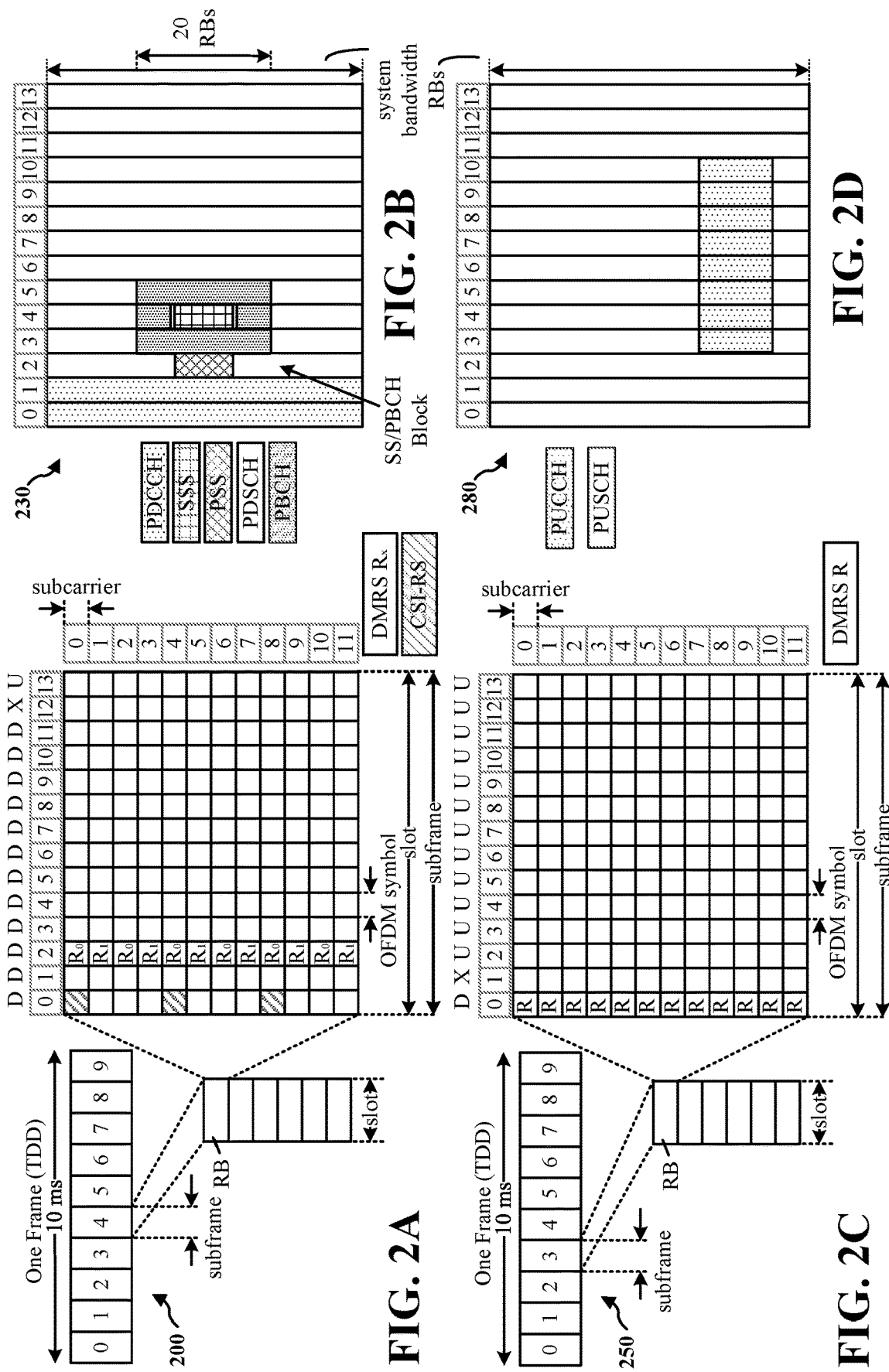
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
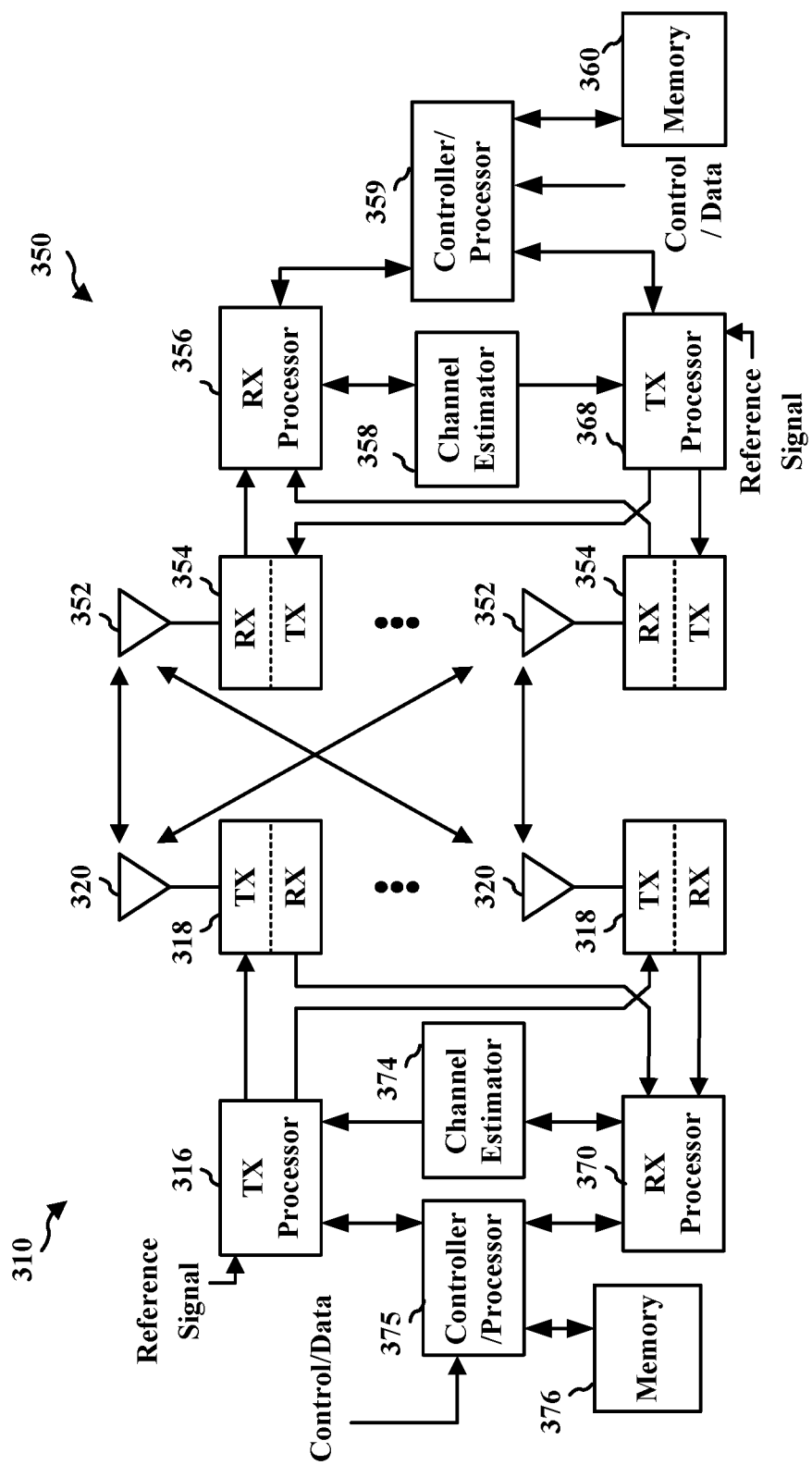
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of mmW communication can induce a high amount of power consumption at a UE. In order to combat this power consumption, some aspects of wireless communication can utilize a connected mode discontinuous reception (cDRX) mechanism or cycle. By doing so, the cDRX cycle can help a UE save on power consumed. In some aspects of wireless communication between a UE and a base station, a UE may go back to sleep during periods of inactivity.

In some instances, cDRX cycles may allow a UE to periodically wake up to monitor a communication or event, and then go back to sleep, e.g., in order to save power. A discontinuous reception (DRX) cycle or mechanism can also offer power savings to the UE. In some instances, a longer DRX cycle may provide an improved power savings to a UE compared to a shorter DRX cycle. For example, if a UE can sleep for an increased amount of time between consecutive wake up sessions, this can improve the power savings to the UE.

In some aspects, a longer DRX cycle may allow a UE to initiate a beam report before the following DRX on period. Although aspects are described in connection with a DRX cycle, the DRX cycle may comprise a cDRX cycle. By doing so, a UE and a base station can be synchronized and/or utilize the same beam, e.g., at the next cDRX wake up period. However, a longer DRX cycle may also introduce a number of issues, such as UE mobility causing synchronization issues with the base station, e.g., during a wake up period. In some instances, if a UE is moving during a DRX sleep period, this may cause the UE to not be able to accurately receive communication from the base station using the previously used beam for a previous on period. Accordingly, when a beam is used to transmit communication from the base station to the UE, it is important for the UE to be able to receive the beam, even if the UE is mobile. As the UE may be more likely to be moving at some point during a longer DRX cycle, this can be an issue for longer DRX cycles. As such, there can be a tradeoff between mobility of the UE for beam tracking and the desire to utilize a longer DRX cycle for power savings.

In some instances, it may be beneficial to select a new candidate beam before the next wake up period. This may help to ensure that a UE is able to receive communication when the wake up period occurs, even if the UE has moved relative to the base station. However, it may be difficult to inform the base station of the new candidate beam when the UE is in sleep mode during a DRX cycle. Aspects presented herein enable the UE to inform the base station of a new candidate beam during the off period of a DRX cycle, so that the base station can switch to the new candidate beam prior to the next on period in the DRX cycle. Accordingly, the UE can wake up in the middle of the DRX cycle, e.g., during the off period or sleep period, to inform the base station of the new candidate beam. In some aspects, the UE may send a beam report to the base station during the off period of the DRX cycle.

As indicated above, aspects of the present disclosure may include a mechanism for UEs to send a beam report to a base station in an off period of a DRX cycle. For instance, a base station may configure a DRX cycle with the UE. In some aspects, a base station can include a longer DRX cycle to save power. The UE can wake up during an off period of a DRX cycle. In some instance, the UE may wake up to measure synchronization signal block (SSB) signals. For example, the SSB is a periodic signal which can be sent during the DRX off periods.

The UE can also determine whether an SSB received for a different beam is better than an SSB received for the current beam. The UE can also compare an SSB received for a different beam and an SSB received for the current beam. For example, the UE may determine whether a metric of at least one of a plurality of candidate beams is different from a metric of a current beam for communication with the base station. The UE can also compare a metric of at least one of a plurality of candidate beams and a metric of a current beam for communication with the base station. In some aspects, the UE may determine a new beam, e.g., based on a received SSB signal, which may be an improvement compared to the current beam, for communication with the base station. Also, the UE can transmit a beam report to the base station during the off period when a better beam is determined, e.g., the metric of the new candidate beam is different from the metric of the current beam. The UE can also transmit a beam report to the base station based on the comparison of the metric of the new candidate beam and the metric of the current beam. Indeed, the UE can initiate a beam report to the base station before next DRX wake up period. The base station can receive the beam report from the UE. If the metric for the new candidate beam is an improvement compared to the current beam, the base station can issue a beam switch to the new candidate beam, e.g., before next wake up period. Accordingly, after the next wake up session, the UE can use the newly selected candidate beam, rather than the current beam.

There can be several ways for a UE to initiate a beam report during the off period of the DRX cycle. For instance, the UE can initiate a beam report using a scheduling request (SR) based procedure. In some aspects, a SR procedure may allow the UE to report to the base station that it wants to transmit information, e.g., even during the DRX off period. Once the SR is sent, the base station assume that the UE is awake and be prepared to receive the beam report. In some aspects, the UE can prepare a beam report after the SR. As such, aspects of the present disclosure can utilize a SR procedure, e.g., during the off period, e.g., sleep period, of a DRX cycle. The SR may be transmitted by the UE using preconfigured SR resources during the off period Further, after the SR is sent to the base station, then a report can be sent through a preconfigured PDCCH resource during the off period to report a new beam.

In some aspects the base station can preconfigure resources in time and/or frequency for a periodic SR PUCCH during the DRX off period. The base station can also preconfigure resources in time and/or frequency for a periodic PUCCH for a CSI report during the off period of the DRX cycle. In some instances, the CSI PUCCH can be configured to be later than the periodic SR PUCCH. Also, the CSI PUCCH can be within a certain time period of the SR PUCCH, e.g., within 4 ms.

When the UE determines that there is a new candidate beam for communication with the base station, and decides to report information about the newly selected beam during the off period of the DRX cycle, there can be a number of different UE actions. For example, the UE can transmit the SR to the base station using based on a preconfigured PUCCH during the off period. Upon receiving the SR, base station may assume the UE is in an active mode and may prepare to be ready to receive the UE beam report. Further, when the UE determines that there is a new candidate beam, the UE may report the new beam through a preconfigured PUCCH, e.g., a periodic channel state information physical uplink control channel (P-CSI PUCCH) during the off period of the DRX cycle.

Upon receiving a UE beam report, the base station may conduct a medium access control (MAC) control element (MAC-CE) based beam switch command to the UE. At the next wake up period, the UE may assume the wakeup PDCCH uses the new candidate beam from the base station. Accordingly, this mechanism may allow the UE to initiate a beam switch during the off period. For instance, the SR based pre-configuration can allow the UE to wake up during the DRX period and report a new candidate beam during the off period of the DRX cycle.

Figure 4:
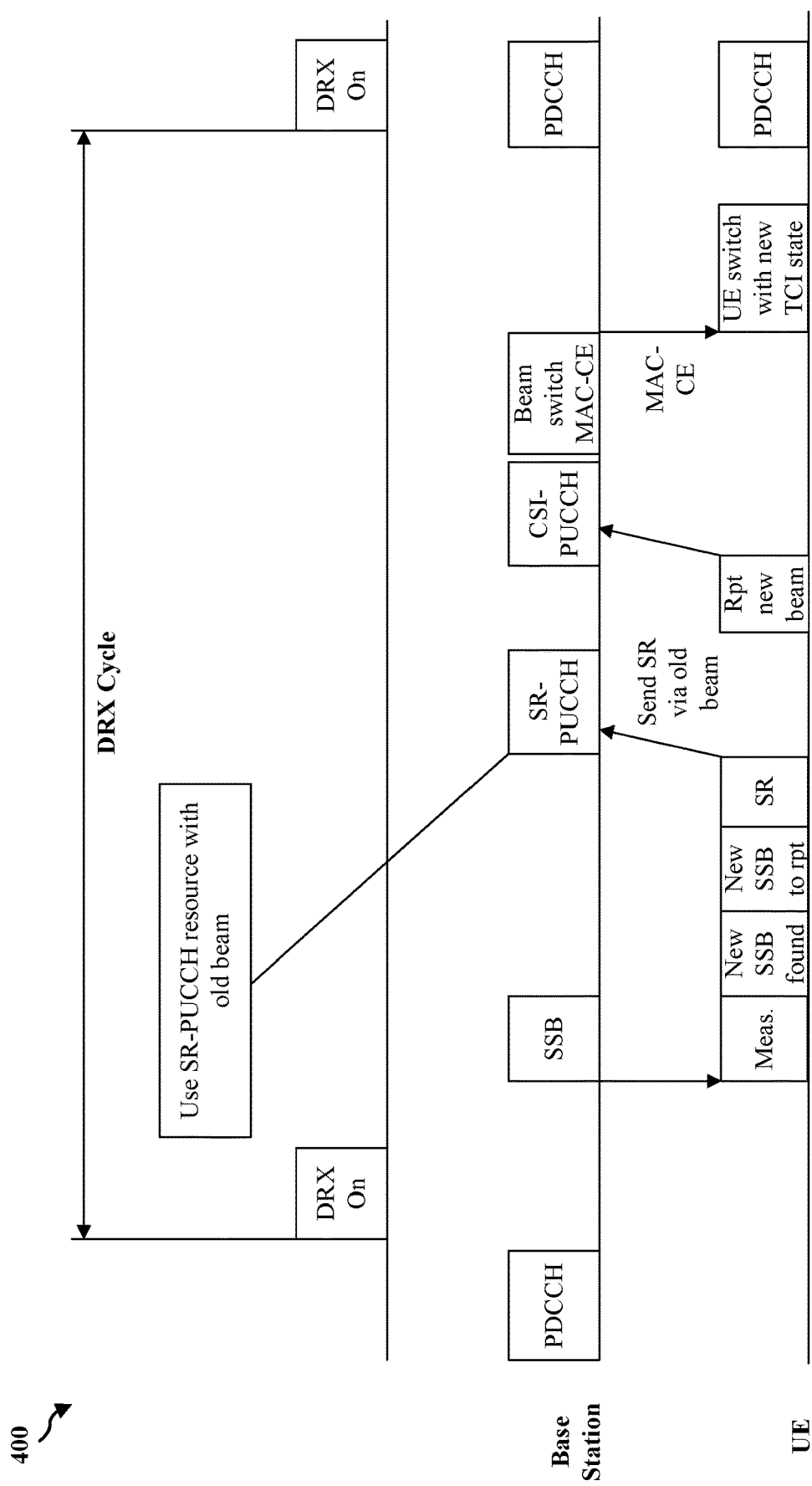
FIG. 4 is a diagram illustrating example transmissions between a base station and a UE.

FIG. 4 is a diagram 400 illustrating transmissions between a base station and a UE. More specifically, FIG. 4 illustrates a timeline of a DRX cycle that may be configured by a base station for a UE. Diagram 400 also shows how a beam switch may be reported using the SR procedure. As illustrated, the UE may measure an SSB from the base station during an off period between DRX on periods. If a new SSB is found to report, the UE may send a SR to the base station during the off period. For instance, the UE can transmit the SR using a preconfigured period SR PUCCH resource. The base station can receive the SR and determine that the UE is active. This may inform the base station to prepare to receive the beam report from the UE. The UE can then report the new candidate beam to the base station during the off period. The report may similarly be sent using preconfigured periodic CSI-PUCCH resources. Once the beam report is sent, the base station can indicate the beam switch to the UE, e.g., by transmitting a MAC-CE based beam switch indication to the UE. The UE may switch to the new beam based on the beam switch indication from the base station. Then, when the next DRX on period occurs, the UE may be ready to receive control signaling, e.g., PDCCH, using the new beam.

Thus, the UE can use the new candidate beam for the next wake up period, e.g., to monitor the PDCCH. This method in diagram 400 can be useful to save power at the UE by enabling longer DRX periods, while also helping to ensure reliable communication between the UE and base station during the DRX on periods. The method in diagram 400 can be useful if the UE is mobile. Accordingly, this method can help to manage beam for communication between the UE and base station when the UE has mobility issues. For example, if there is a mobility issue with the UE, then a beam change can be issued, e.g., while the UE is moving during an off period.

In some aspects, the base station may preconfigure a periodic PUCCH for beam failure recovery (BFR) during an off period as part of a DRX configuration for a UE. In some instances, when the UE detects a beam failure or determines that there is a new, better beam, the UE can inform the base station of a desire to switch beams during an off period, so that a new beam may be selected before a next on duration. the. This method can also be based on a measurement for a beam being below a threshold. For instance, the BFR method can be utilized when the UE determines that there is a new candidate beam and decides to report the beam during the cDRX off period. Further, the UE can trigger a BFR procedure using a BFR PUCCH, e.g., with the newly detected candidate beam. So the UE can issue a BFR request even if there was no beam failure detected.

The UE can also request a BFR procedure when a new candidate beam is detected, e.g., if a metric of the new candidate beam is an improvement compared to a metric of a current beam. Accordingly, aspects of the present disclosure can utilize the BFR procedure to switch beams during an off period after a more desirable beam is detected. In some aspects, a current beam might be functional, but the UE may have determined an improved beam to utilize. Upon successful BFR, both the UE and the base station may utilize the new candidate beam. At next wake up, the UE can assume the wake up PDCCH is carried with new candidate beam.

Figure 5:
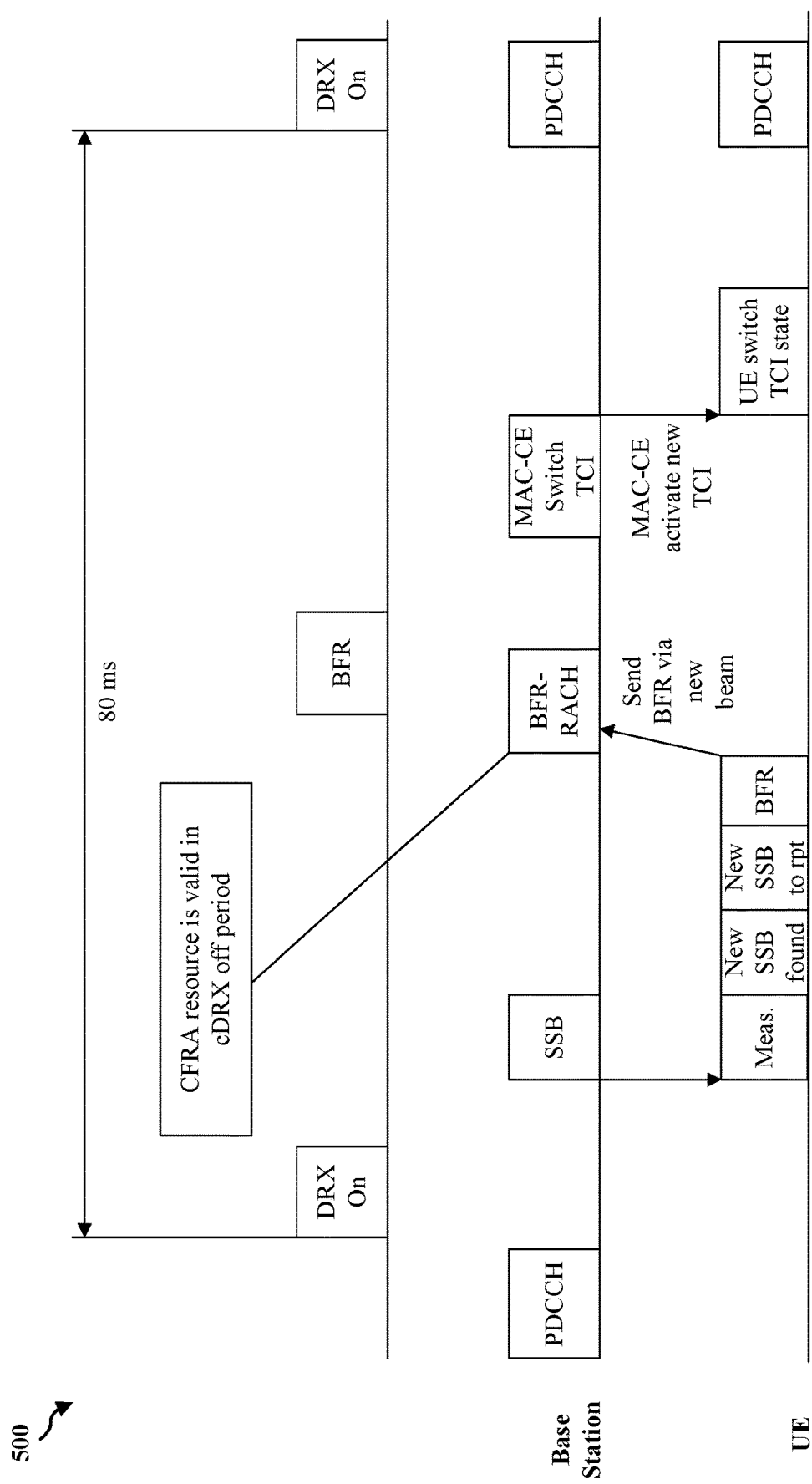
FIG. 5 is a diagram illustrating example transmissions between a base station and a UE.

FIG. 5 is a diagram 500 illustrating transmissions between a base station and a UE. More specifically, FIG. 5 illustrates a timeline of a DRX cycle between a base station and a UE, e.g., using preconfigured BFR resources during an off period of the DRX cycle. As shown in FIG. 5, the UE can perform a measurement, e.g., for a new beam or SSB during the off period. The UE can then determine a new beam or SSB to report, during the off period. Next, the UE can use preconfigured BFR resources in time and/or frequency to report information about the new beam and/or to request a BFR procedure. After the UE requests the BFR procedure, the base station may switch from the current beam to the new candidate beam. For example, the base station can transmit a MAC-CE indicating the beam switch, where the MAC-CE is activated for a new transmission configuration indicator (TCI). The UE can then switch the TCI state to be ready to receive control signaling using the new beam at the next DRX on duration.

As mentioned above, aspects of the present disclosure can utilize multiple methods for the UE to wake up and determine a new candidate beam, e.g., during an off period of a DRX cycle. By doing so, the new candidate beam can be used for communication between the UE and a base station at a wake up period following the UE off period of the DRX cycle. As such, aspects of the present disclosure may allow the UE to wake up during a DRX off period to measure candidate beams. Further, the UE can measure candidate beams and/or report on candidate beams during a DRX off period utilizing an SR based method or a BFR based method.

The aforementioned methods can provide a number of different benefits or advantages. For instance, the proposed methods herein can improve the performance of UE mobility in DRX mode with a long DRX cycle. Aspects of the present disclosure can also provide for an improved power savings to the UE, e.g., based on the long DRX cycle. Accordingly, aspects of the present disclosure can include an improved beam performance for UE mobility compared to beam performance for power savings at the UE.

Figure 6:
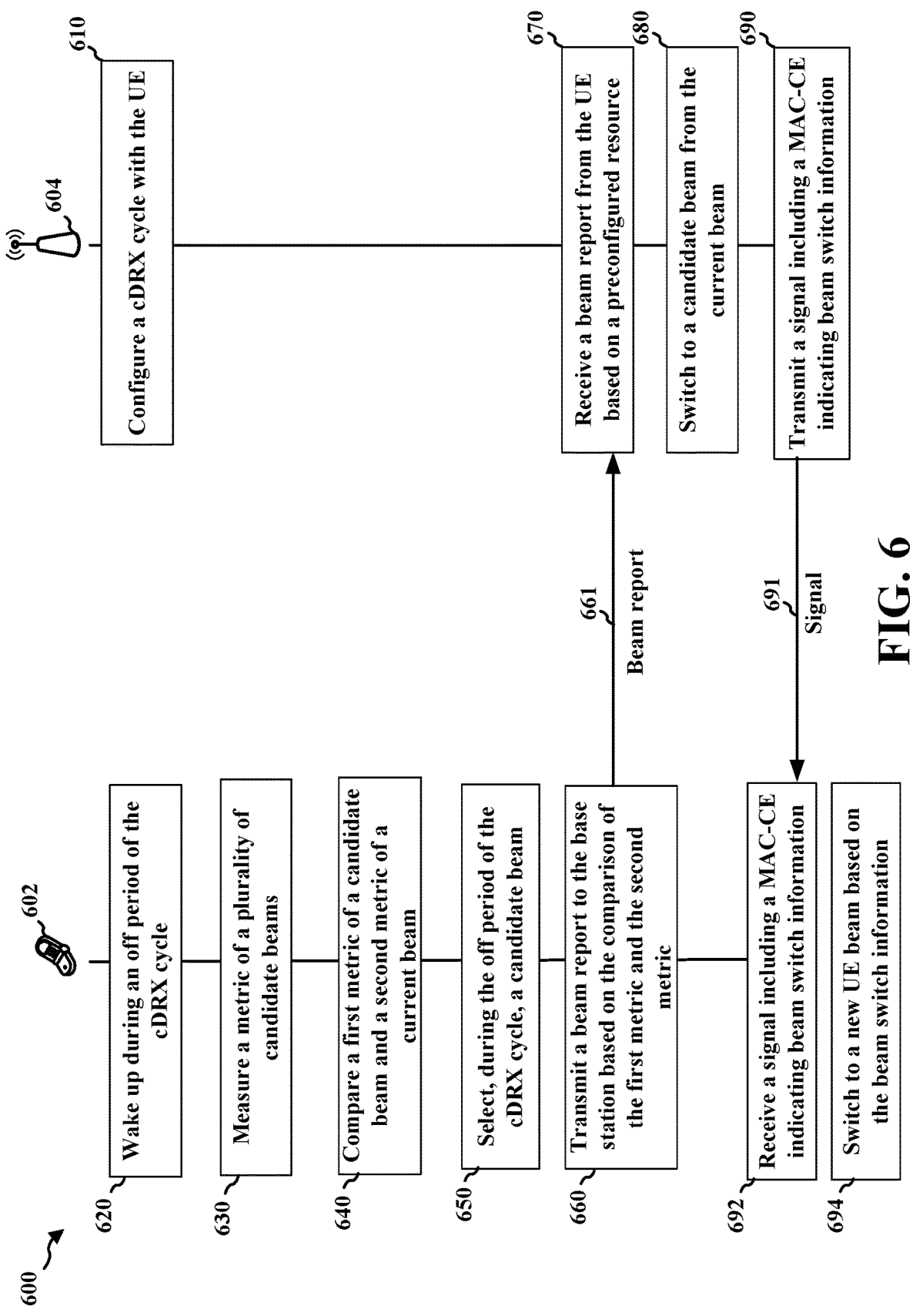
FIG. 6 is a diagram illustrating transmissions between a base station and a UE.

FIG. 6 is a diagram 600 illustrating transmissions between a UE 602 and a base station 604. For instance, base station 604 can configure 610 a cDRX cycle with the UE 602. The base station 604 can also configure a physical uplink control channel (PUCCH) for communication with the UE 602 during an off period of the cDRX cycle. The UE 602 can also wake up 620 during an off period of the cDRX cycle. Also, the UE 602 can measure 630 a metric of each of the plurality of candidate beams for communication with the base station 604. The UE 602 can also compare 640 a first metric of at least one of a plurality of candidate beams and a second metric of a current beam for communication with the base station. Further, the UE 602 can select 650, during the off period of the cDRX cycle, the at least one of the plurality of candidate beams for communication with the base station.

The UE 602 can also transmit a SR during the off period and prior to transmitting a beam report, where the SR can be transmitted using a preconfigured, periodic SR uplink control channel resource. The UE 602 can also generate a beam report 661 during the off period of the cDRX cycle based on the comparison of the first metric of the at least one of the plurality of candidate beams and the second metric of the current beam. Additionally, the UE 602 can transmit 660 a beam report 661 to the base station, during the off period, based on the comparison of the first metric of the at least one of the plurality of candidate beams and the second metric of the current beam.

In some aspects, the beam report 661 can be transmitted to the base station 604 via a PUCCH. Moreover, in some aspects, the UE 602 can transmit the beam report 661 during the off period using a preconfigured resource. In addition, the preconfigured resource can comprise a periodic uplink control channel resource for a channel state information (CSI) report during the off period. Also, the preconfigured resource can comprise a periodic uplink control channel resource for beam failure recovery (BFR) during the off period. In some aspects, at least one of the first metric or the second metric can be signal quality.

The base station 604 can also receive 670 the beam report 661 from the UE 602 during an off period of the cDRX cycle based on a preconfigured resource. In some aspects, the beam report can include a comparison of a first metric of at least one of a plurality of candidate beams and a second metric of a current beam. In some instances, the preconfigured resource can comprise a PUCCH. The preconfigured resource can also comprise a periodic uplink control channel resource for a CSI report during the off period. Further, the preconfigured resource can comprise a periodic uplink control channel resource for beam failure recovery (BFR) during the off period. In some aspects, the PUCCH can be configured within 4 ms of a SR.

The base station 604 can also receive a SR during the off period and prior to receiving the beam report. In some aspects, the SR can be received using a preconfigured, periodic SR uplink control channel resource. Additionally, the base station 604 can switch 680 to the at least one of the plurality of candidate beams from the current beam, during the off period, for communication with the UE 602 in a following on period. The base station 604 can also transmit 690 a signal 691 to the UE 602, where the signal 691 may include a medium access control (MAC) control element (MAC-CE) indicating beam switch information based on the beam report from the UE. Also, the UE 602 may receive 692 the signal 691 from the base station 604, where the signal 691 may include a MAC-CE indicating beam switch information. The UE 602 may also switch 694 to a new UE beam for communication with the base station 604 based on the beam switch information.

Figure 7:
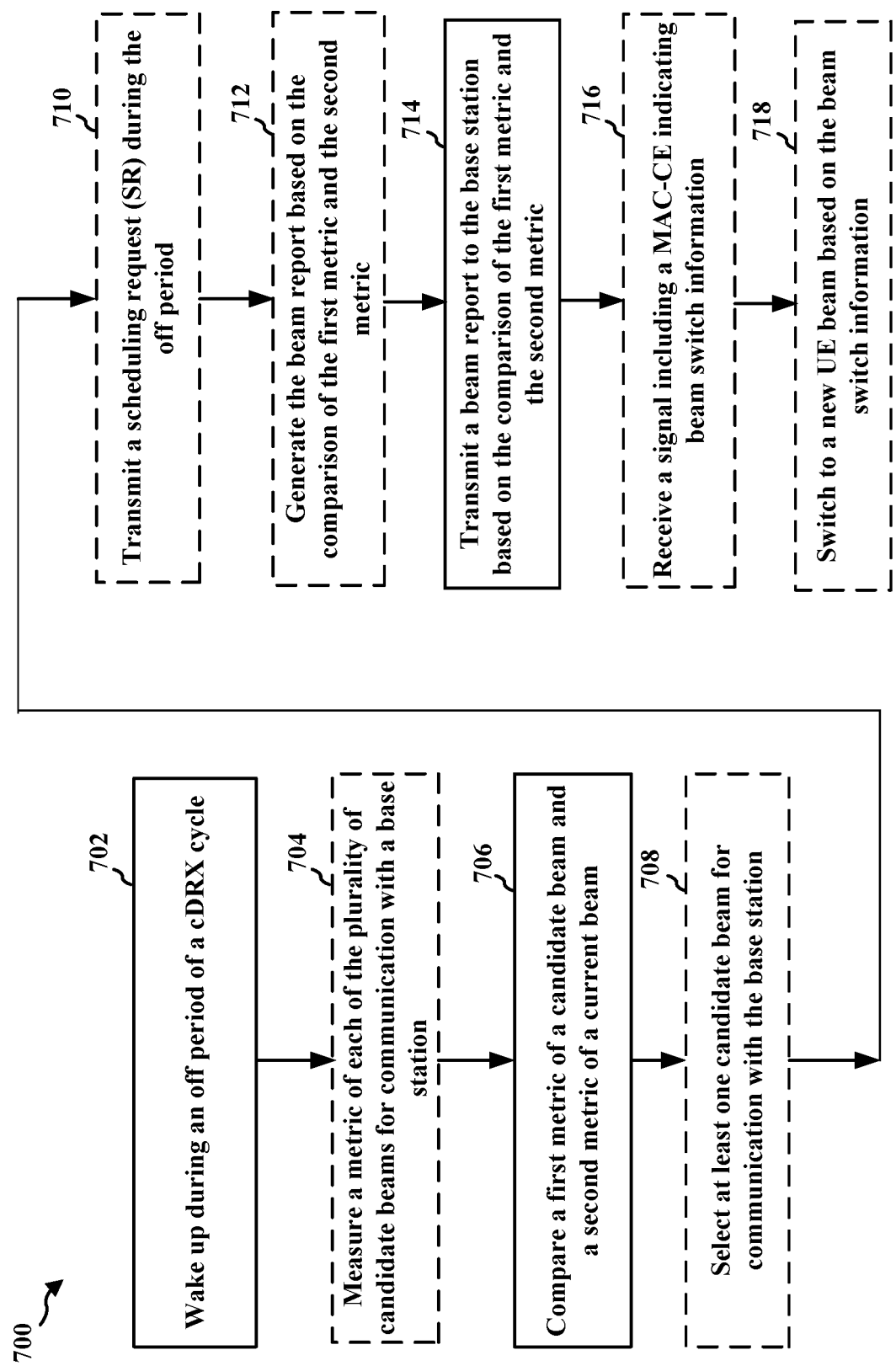
FIG. 7 is a flowchart of a method of wireless communication.

FIG. 7 is a flowchart 700 of a method of wireless communication. The method may be performed by a UE or a component of a UE (e.g., UE 104, 350, 602, 1150; apparatus 802; the processing system 914, which may include memory 906 and which may be the entire UE 350 or a component of the UE 350, such as the TX processor 368, the RX processor 356, and/or the controller/processor 359) communicating with a base station (e.g., base station 102, 180, 310, 604, 850). Optional aspects are illustrated with a dashed line. The methods described herein can provide a number of benefits, such as improving communication signaling, resource utilization, and/or power savings.

At 702, the UE can wake up during an off period of the cDRX cycle, as described in connection with the examples in FIGS. 4, 5, and 6. For example, wake up component 806 of apparatus 802 may wake up during an off period of the cDRX cycle. At 704, the UE can measure a metric of each of the plurality of candidate beams for communication with a base station, as described in connection with the examples in FIGS. 4, 5, and 6. For example, measurement component 808 of apparatus 802 may measure a metric of each of the plurality of candidate beams. At 706, the UE can also compare a first metric of at least one of a plurality of candidate beams and a second metric of a current beam for communication with the base station, as described in connection with the examples in FIGS. 4, 5, and 6. For example, comparison component 810 of apparatus 802 may compare a first metric of at least one of a plurality of candidate beams and a second metric of a current beam. At 708, the UE can select, during the off period of the cDRX cycle, the at least one of the plurality of candidate beams for communication with the base station, as described in connection with the examples in FIGS. 4, 5, and 6. For example, selection component 812 of apparatus 802 may select, during the off period of the cDRX cycle, at least one of the plurality of candidate beams.

At 710, the UE can also transmit a SR during the off period and prior to transmitting a beam report, where the SR can be transmitted using a preconfigured, periodic SR uplink control channel resource, as described in connection with the examples in FIGS. 4, 5, and 6. For example, transmission component 814 of apparatus 802 may transmit a SR during the off period. At 712, the UE can also generate a beam report during the off period of the cDRX cycle based on the comparison of the first metric of the at least one of the plurality of candidate beams and the second metric of the current beam, as described in connection with the examples in FIGS. 4, 5, and 6. For example, comparison component 810 of apparatus 802 may generate a beam report during the off period of the cDRX cycle.

At 714, the UE can transmit a beam report to the base station, during the off period, based on the comparison of the first metric of the at least one of the plurality of candidate beams and the second metric of the current beam, as described in connection with the examples in FIGS. 4, 5, and 6. For example, transmission component 814 of apparatus 802 may transmit a beam report to the base station during the off period. At 716, the UE may receive a signal from the base station, where the signal may include a MAC-CE indicating beam switch information, as described in connection with the examples in FIGS. 4, 5, and 6. For example, reception component 804 of apparatus 802 may receive a signal from the base station, where the signal may include a MAC-CE indicating beam switch information. At 718, the UE may switch to a new UE beam for communication with the base station based on the beam switch information, as described in connection with the examples in FIGS. 4, 5, and 6. For example, selection component 812 of apparatus 802 may switch to a new UE beam for communication with the base station based on the beam switch information.

In some aspects, the beam report can be transmitted to the base station via a PUCCH, as described in connection with the examples in FIGS. 4, 5, and 6. Moreover, in some aspects, the UE can transmit the beam report during the off period using a preconfigured resource, as described in connection with the examples in FIGS. 4, 5, and 6. In addition, the preconfigured resource can comprise a periodic uplink control channel resource for a CSI report during the off period, as described in connection with the examples in FIGS. 4, 5, and 6. Also, the preconfigured resource can comprise a periodic uplink control channel resource for BFR during the off period, as described in connection with the examples in FIGS. 4, 5, and 6. In some aspects, at least one of the first metric or the second metric can be signal quality, as described in connection with the examples in FIGS. 4, 5, and 6.

Figure 8:
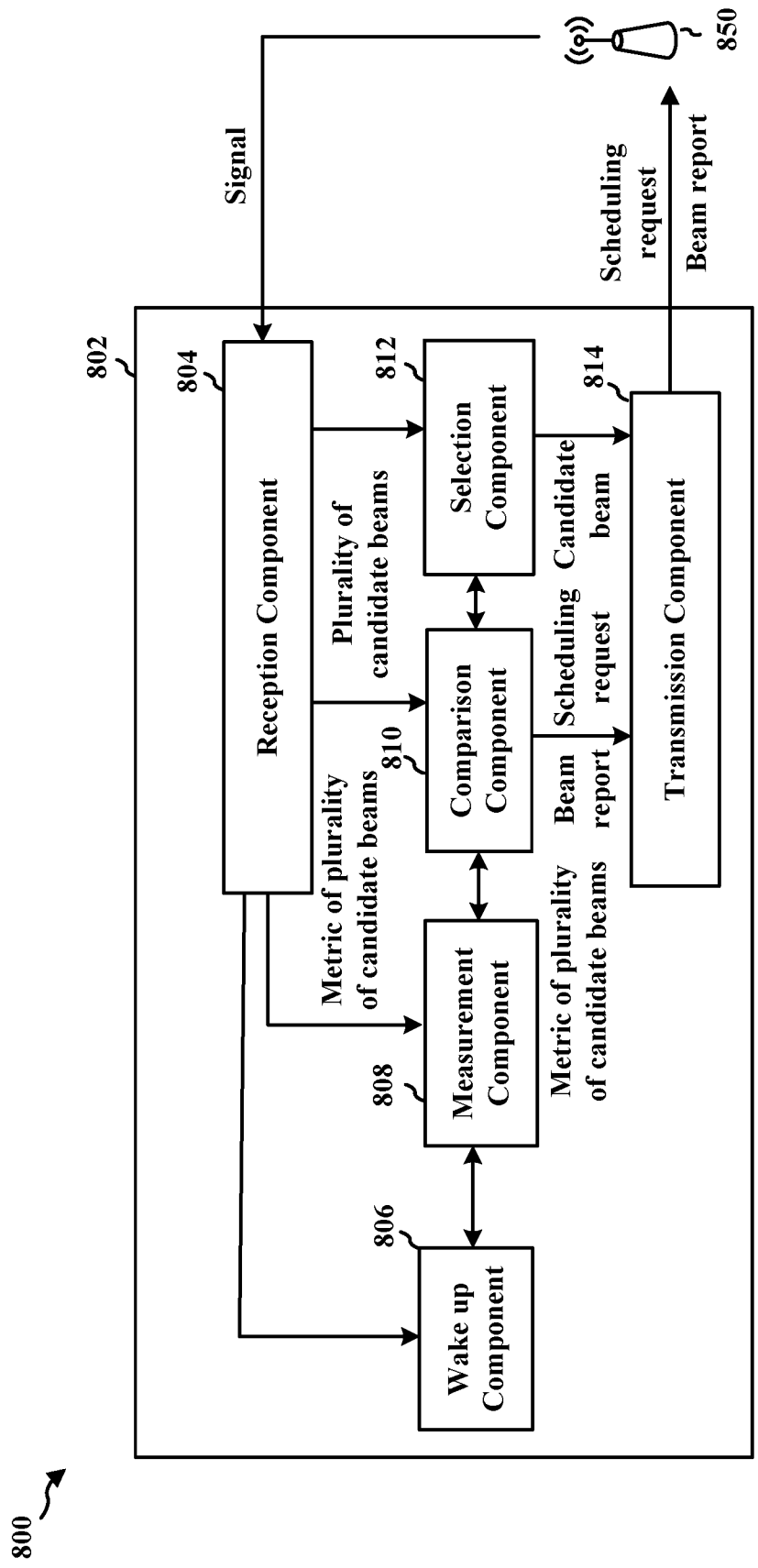
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE. The apparatus includes a reception component 804 that is configured to receive communication or a signal from other components, e.g., base station 850. Reception component 804 may also be configured to receive a signal from the base station, where the signal may include a MAC-CE indicating beam switch information, e.g., as described in connection with step 716 above. The apparatus also includes a wake up component 806 that is configured to wake up during an off period of the cDRX cycle, e.g., as described in connection with step 702 above. The apparatus also includes a measurement component 808 that is configured to measure a metric of each of the plurality of candidate beams for communication with a base station, e.g., as described in connection with step 704 above. The apparatus also includes a comparison component 810 that is configured to compare a first metric of at least one of a plurality of candidate beams and a second metric of a current beam for communication with the base station, e.g., as described in connection with step 706 above. Comparison component 810 can also be configured to generate a beam report based on the comparison of the first metric and the second metric, as described in connection with step 712 above. The apparatus also includes a selection component 812 that is configured to select, during the off period of the cDRX cycle, the at least one of the plurality of candidate beams for communication with the base station, e.g., as described in connection with step 708 above. Selection component 812 may also be configured to switch to a new UE beam for communication with the base station based on the beam switch information, e.g., as described in connection with step 718 above. The apparatus also includes a transmission component 814 that is configured to transmit a beam report to the base station, during the off period, based on the comparison of the first metric of the at least one of the plurality of candidate beams and the second metric of the current beam, e.g., as described in connection with step 714 above. Transmission component 814 can also be configured to transmit a SR during the off period and prior to transmitting a beam report, e.g., as described in connection with step 710 above.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
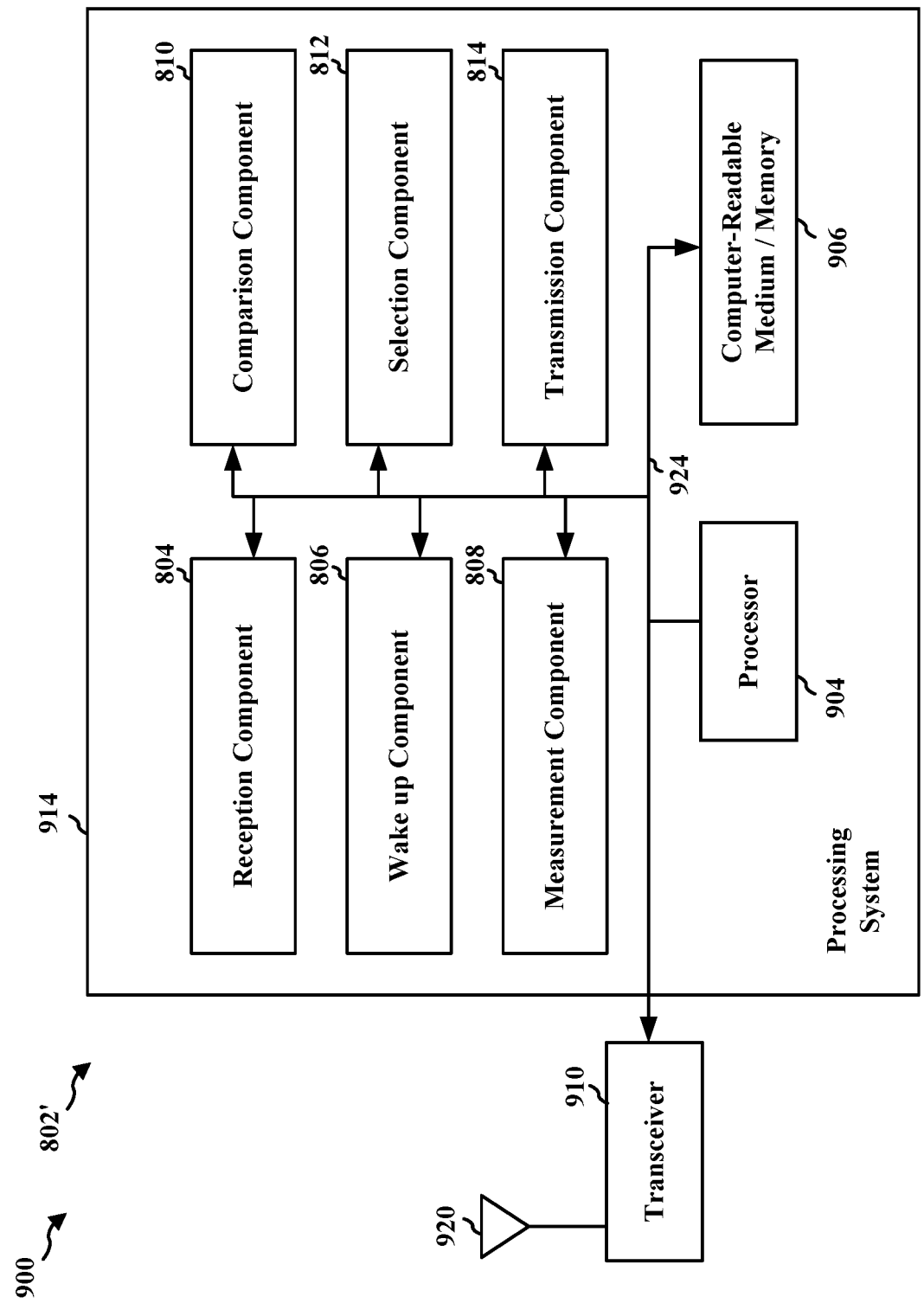
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 814, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for waking up during an off period of a connected mode discontinuous reception (cDRX) cycle with a base station. The apparatus can also include means for comparing a first metric of at least one of a plurality of candidate beams and a second metric of a current beam for communication with the base station. The apparatus can also include means for transmitting a beam report to the base station, during the off period, based on the comparison of the first metric of the at least one of the plurality of candidate beams and the second metric of the current beam. The apparatus can also include means for transmitting a SR during the off period and prior to transmitting the beam report. The apparatus can also include means for measuring a metric of each of the plurality of candidate beams for communication with the base station. The apparatus can also include means for selecting, during the off period of the cDRX cycle, the at least one of the plurality of candidate beams for communication with the base station. The apparatus can also include means for generating the beam report during the off period of the cDRX cycle based on the comparison of the first metric of the at least one of the plurality of candidate beams and the second metric of the current beam. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
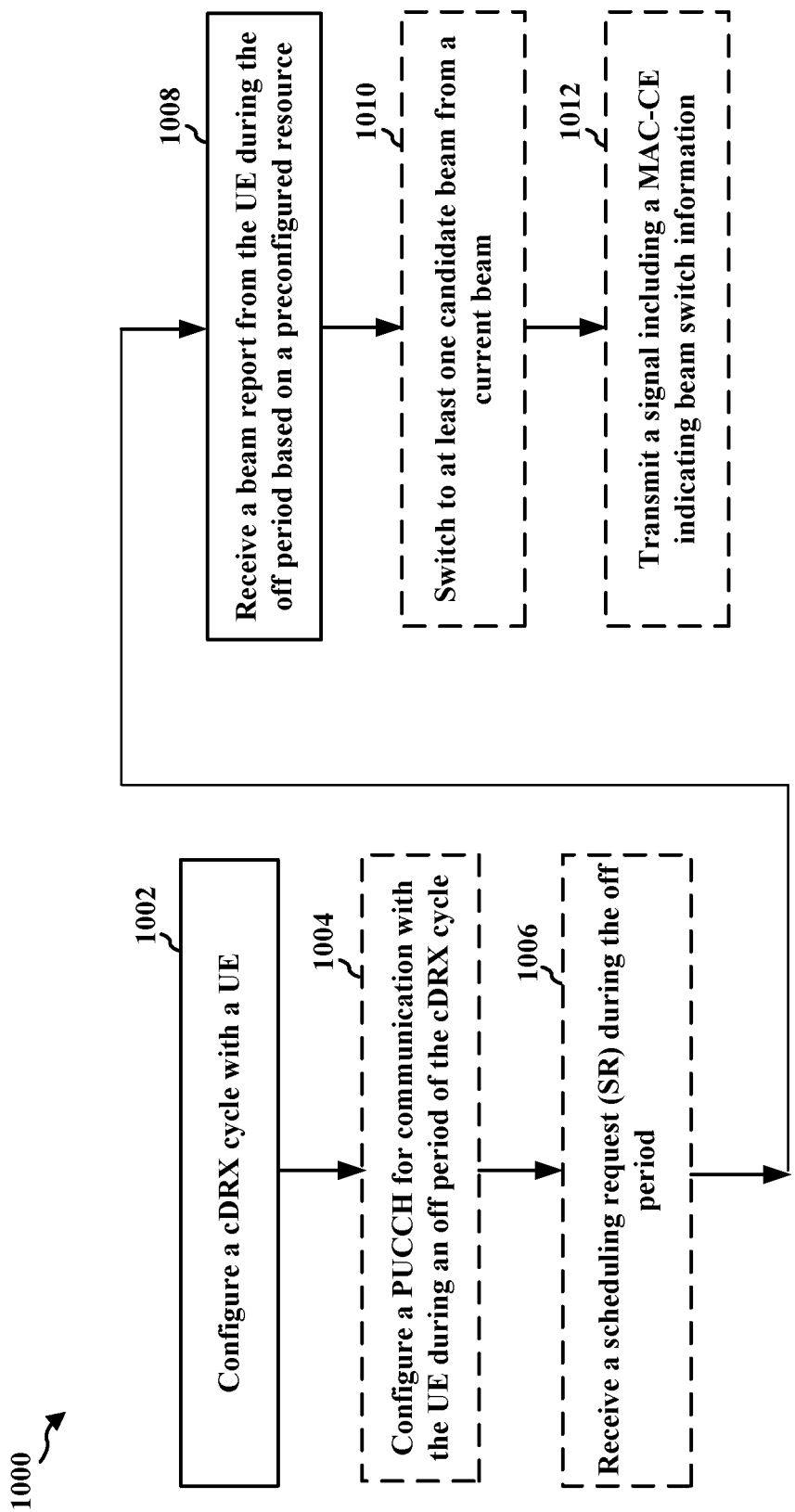
FIG. 10 is a flowchart of a method of wireless communication.

FIG. 10 is a flowchart 1000 of a method of wireless communication. The method may be performed by a base station or a component of a base station (e.g., base station 102, 180, 310, 604, 850, apparatus 1102; the processing system 1214, which may include memory 376 and which may be the entire base station 310 or a component of a base station, such as the TX processor 316, the RX processor 370, and/or the controller/processor 375) communicating with a UE (e.g., UE 104, 350, 602, 1150, apparatus 802). Optional aspects are illustrated with a dashed line. The methods described herein can provide a number of benefits, such as improving communication signaling, resource utilization, and/or power savings.

At 1002, the base station can configure a cDRX cycle with a UE, as described in connection with the examples in FIGS. 4, 5, and 6. For example, configuration component 1106 of apparatus 1102 may configure a cDRX cycle with a UE. At 1004, the base station can also configure a PUCCH for communication with the UE during an off period of the cDRX cycle, as described in connection with the examples in FIGS. 4, 5, and 6. For example, configuration component 1106 of apparatus 1102 may configure a PUCCH for communication with the UE during an off period of the cDRX cycle. At 1006, the base station can also receive a SR during the off period and prior to receiving the beam report, as described in connection with the examples in FIGS. 4, 5, and 6. For example, reception component 1104 of apparatus 1102 may receive a SR during the off period and prior to receiving the beam report. In some aspects, the SR can be received using a preconfigured, periodic SR uplink control channel resource, as described in connection with the examples in FIGS. 4, 5, and 6.

At 1008, the base station can receive the beam report from the UE during an off period of the cDRX cycle based on a preconfigured resource, as described in connection with the examples in FIGS. 4, 5, and 6. For example, reception component 1104 of apparatus 1102 may receive the beam report from the UE during an off period of the cDRX cycle based on a preconfigured resource. In some aspects, the beam report can include a comparison of a first metric of at least one of a plurality of candidate beams and a second metric of a current beam, as described in connection with the examples in FIGS. 4, 5, and 6. In some aspects, at least one of the first metric or the second metric can be signal quality, as described in connection with the examples in FIGS. 4, 5, and 6.

In some instances, the preconfigured resource can comprise a PUCCH, as described in connection with the examples in FIGS. 4, 5, and 6. The preconfigured resource can also comprise a periodic uplink control channel resource for a CSI report during the off period, as described in connection with the examples in FIGS. 4, 5, and 6. Further, the preconfigured resource can comprise a periodic uplink control channel resource for BFR during the off period, as described in connection with the examples in FIGS. 4, 5, and 6. In some aspects, the PUCCH can be configured within 4 ms of a SR, as described in connection with the examples in FIGS. 4, 5, and 6.

At 1010, the base station can switch to the at least one of the plurality of candidate beams from the current beam, during the off period, for communication with the UE in a following on period, as described in connection with the examples in FIGS. 4, 5, and 6. For example, switching component 1108 of apparatus 1102 may switch to the at least one of the plurality of candidate beams from the current beam, during the off period, for communication with the UE in a following on period. At 1012, the base station may transmit a signal to the UE, where the signal may include a medium access control (MAC) control element (MAC-CE) indicating beam switch information based on the beam report from the UE, as described in connection with the examples in FIGS. 4, 5, and 6. For example, transmission component 1110 of apparatus 1102 may transmit a signal to the UE, where the signal may include a MAC-CE indicating beam switch information based on the beam report from the UE.

Figure 11:
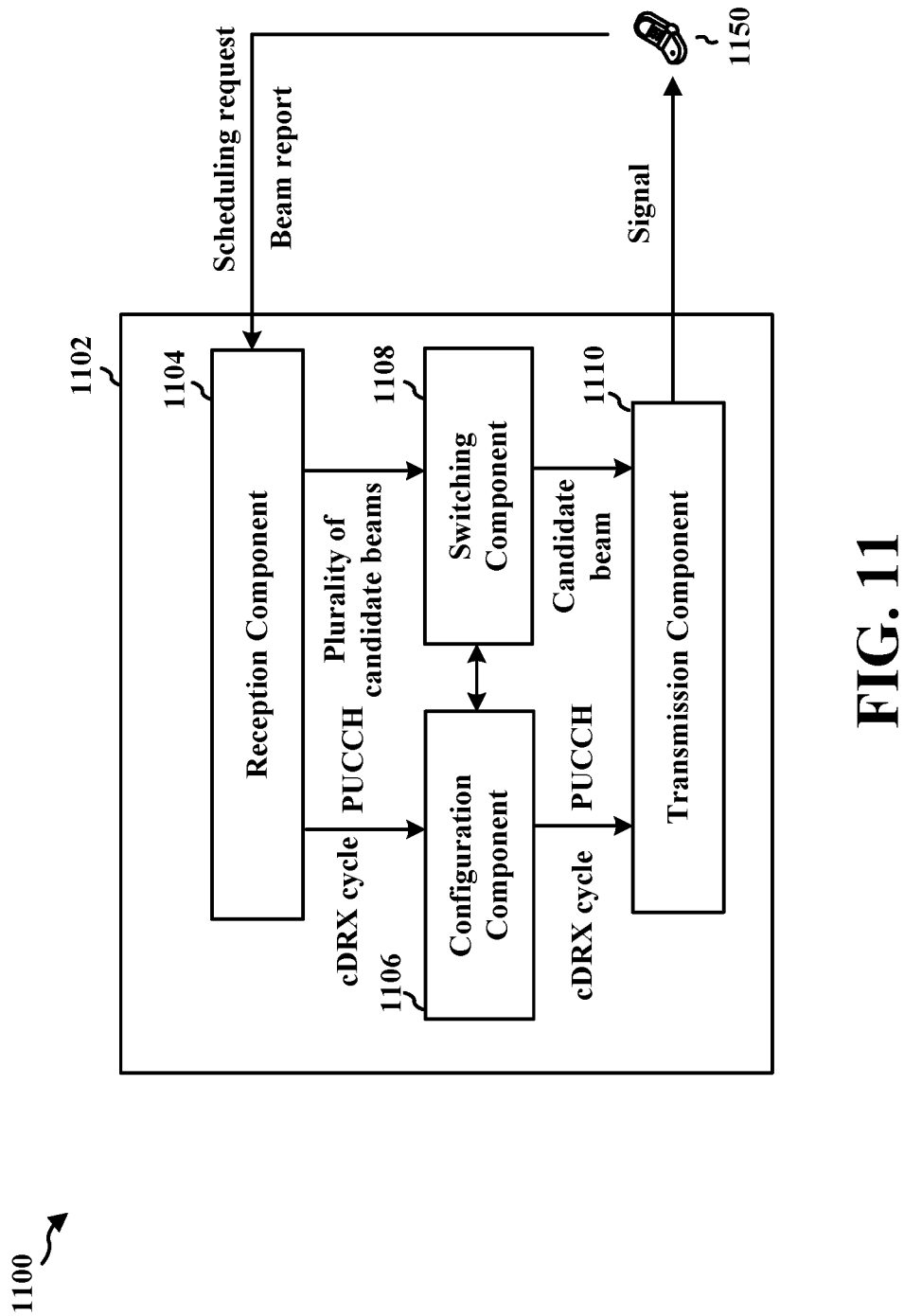
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a base station. The apparatus includes a reception component 1104 that is configured to receive the beam report from a UE during an off period of the cDRX cycle based on a preconfigured resource, e.g., as described in connection with step 1008 above. Reception component 1104 can also be configured to receive a SR during the off period and prior to receiving the beam report, e.g., as described in connection with step 1006 above. The apparatus includes a configuration component 1106 that is configured to configure a cDRX cycle with a UE, e.g., as described in connection with step 1002 above. Configuration component 1106 can also be configured to configure a PUCCH for communication with the UE during an off period of the cDRX cycle, e.g., as described in connection with step 1004 above. The apparatus includes a switching component 1108 that is configured to switch to the at least one of the plurality of candidate beams from the current beam, during the off period, for communication with the UE in a following on period, e.g., as described in connection with step 1010 above. The apparatus also includes a transmission component 1110 that is configured to transmit communication or a signal from other components, e.g., UE 1150. Transmission component 1110 may also be configured to transmit a signal to the UE, where the signal may include a MAC-CE indicating beam switch information based on the beam report from the UE, e.g., as described in connection with step 1012 above.

The apparatus may include additional components that perform each of the blocks of the algorithm in the aforementioned flowcharts of FIGS. 6 and 10. As such, each block in the aforementioned flowcharts of FIGS. 6 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
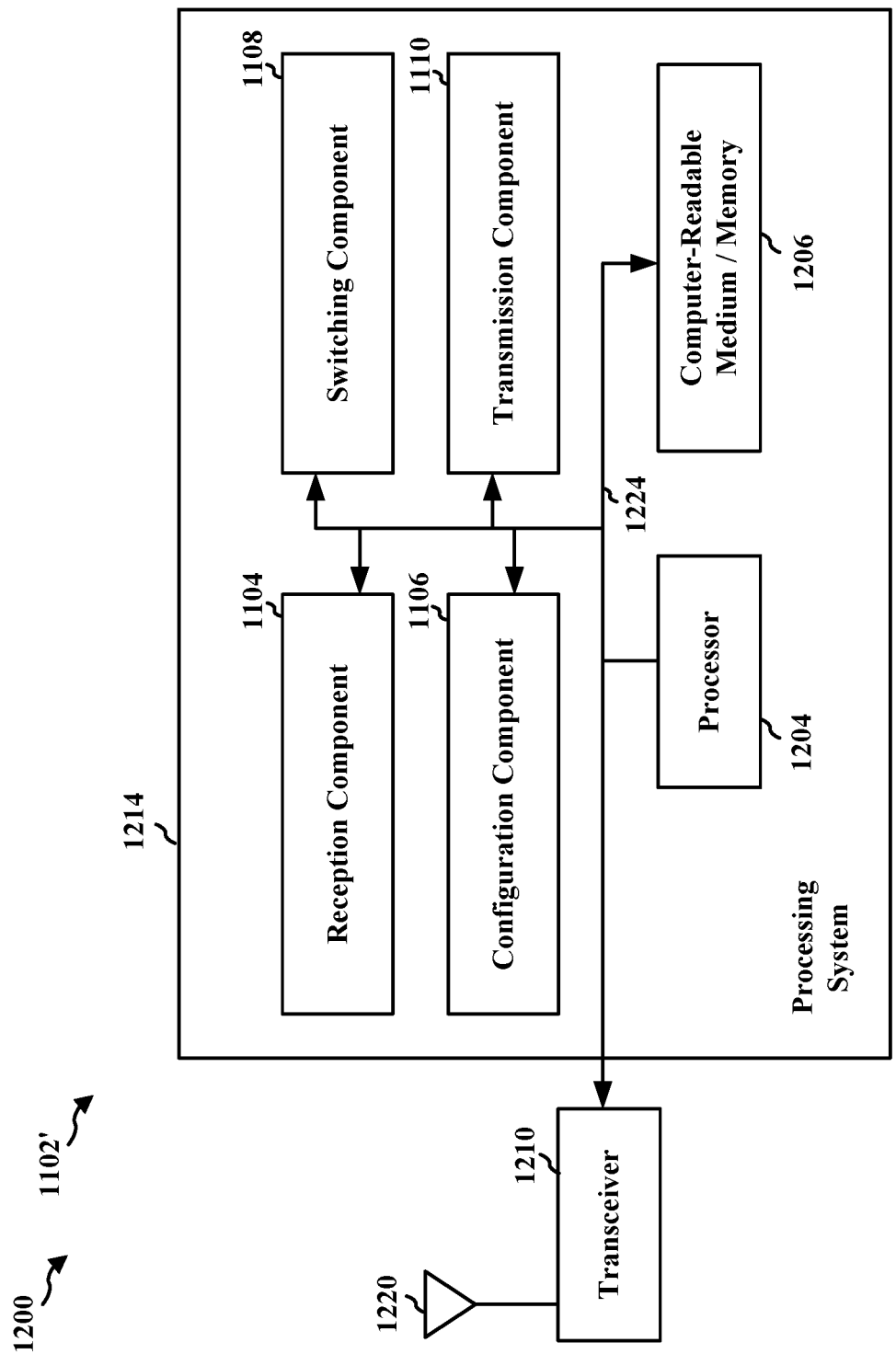
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3).

In one configuration, the apparatus 1102/1102' for wireless communication includes means for configuring a cDRX cycle with a UE. The apparatus can also include means for receiving a beam report from the UE during an off period of the cDRX cycle based on a preconfigured resource. The apparatus can also include means for switching to the at least one of the plurality of candidate beams from the current beam, during the off period, for communication with the UE in a following on period. The apparatus can also include means for configuring the PUCCH for communication with the UE during the off period. The apparatus can also include means for receiving a SR during the off period and prior to receiving the beam report. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Aspects of the present disclosure described herein can provide a number of benefits or advantages, such as improving communication signaling, resource utilization, and/or power savings. For instance, aspects of the present disclosure can improve the performance of UE mobility in cDRX mode with a long DRX cycle. Aspects of the present disclosure can also provide for an improved power savings to the UE, e.g., based on the long cDRX cycle. Thus, aspects of the present disclosure can include an improved beam performance for UE mobility compared to beam performance for power savings at the UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   waking up during an off period of a connected mode discontinuous reception (cDRX) cycle;
   comparing a first metric of at least one of a plurality of candidate beams and a second metric of a current beam for communication with a base station, wherein at least one of the first metric or the second metric is signal quality associated with a synchronization signal block (SSB);
   transmitting a scheduling request (SR) during the off period and prior to transmitting a beam report; and
   transmitting the beam report to the base station, during the off period, based on the comparison of the first metric of the at least one of the plurality of candidate beams and the second metric of the current beam, wherein the beam report is transmitted to the base station via a periodic channel state information (CSI) physical uplink control channel (PUCCH) (P-CSI PUCCH).

2. The method of claim 1, wherein the UE transmits the beam report during the off period using a preconfigured resource.

3. The method of claim 2, wherein the preconfigured resource comprises a periodic uplink control channel resource for a CSI report during the off period.

4. The method of claim 3, wherein the SR is transmitted using a preconfigured, periodic SR uplink control channel resource.

5. The method of claim 2, wherein the preconfigured resource comprises a periodic uplink control channel resource for beam failure recovery (BFR) during the off period.

6. The method of claim 1, further comprising:
   measuring a metric of each of the plurality of candidate beams for communication with the base station.

7. The method of claim 1, further comprising:
   selecting, during the off period of the cDRX cycle, the at least one of the plurality of candidate beams for communication with the base station.

8. The method of claim 1, further comprising:
   generating the beam report during the off period of the cDRX cycle based on the comparison of the first metric of the at least one of the plurality of candidate beams and the second metric of the current beam.

9. The method of claim 1, further comprising:
   receiving a signal from the base station, wherein the signal includes a medium access control (MAC) control element (MAC-CE) indicating beam switch information.

10. The method of claim 9, further comprising:
    switching to a new UE beam for communication with the base station based on the beam switch information.

11. A method of wireless communication at a base station, comprising:
    configuring a connected mode discontinuous reception (cDRX) cycle with a user equipment (UE);
    receiving a scheduling request (SR) during an off period and prior to receiving a beam report; and
    receiving the beam report from the UE during the off period of the cDRX cycle based on a preconfigured resource, wherein the beam report includes a comparison of a first metric of at least one of a plurality of candidate beams and a second metric of a current beam, and the beam report is received from the UE via a periodic channel state information (CSI) physical uplink control channel (PUCCH) (P-CSI PUCCH), wherein at least one of the first metric or the second metric is signal quality associated with a synchronization signal block (SSB).

12. The method of claim 11, further comprising:
    switching to the at least one of the plurality of candidate beams from the current beam, during the off period, for communication with the UE in a following on period.

13. The method of claim 11, further comprising:
    transmitting a signal to the UE, wherein the signal includes a medium access control (MAC) control element (MAC-CE) indicating beam switch information based on the beam report from the UE.

14. The method of claim 11, wherein the preconfigured resource comprises the P-CSI PUCCH, the method further comprising:
    configuring the P-CSI PUCCH for communication with the UE during the off period.

15. The method of claim 14, wherein the P-CSI PUCCH is configured within a time period of the SR.

16. The method of claim 11, wherein the preconfigured resource comprises a periodic uplink control channel resource for a CSI report during the off period.

17. The method of claim 16, wherein the SR is received using a preconfigured, periodic SR uplink control channel resource.

18. The method of claim 11, wherein the preconfigured resource comprises a periodic uplink control channel resource for beam failure recovery (BFR) during the off period.

19. An apparatus for wireless communication at a User Equipment (UE), comprising:
a memory; and
at least one processor coupled to the memory and configured to:
wake up during an off period of a connected mode discontinuous reception (cDRX) cycle;
compare a first metric of at least one of a plurality of candidate beams and a second metric of a current beam for communication with a base station, wherein at least one of the first metric or the second metric is signal quality associated with a synchronization signal block (SSB);
transmit a scheduling request (SR) during the off period and prior to transmitting a beam report; and
transmit the beam report to the base station, during the off period, based on the comparison of the first metric of the at least one of the plurality of candidate beams and the second metric of the current beam, wherein the beam report is transmitted to the base station via a periodic channel state information (CSI) physical uplink control channel (PUCCH) (P-CSI PUCCH).

20. The apparatus of claim 19, wherein the UE transmits the beam report during the off period using a preconfigured resource;
wherein the preconfigured resource comprises a periodic uplink control channel resource for a channel state information (CSI) report during the off period.

21. The apparatus of claim 20, wherein the SR is transmitted using a preconfigured, periodic SR uplink control channel resource.

22. The apparatus of claim 19, wherein the UE transmits the beam report during the off period using a preconfigured resource;
wherein the preconfigured resource comprises a periodic uplink control channel resource for beam failure recovery (BFR) during the off period.

23. The apparatus of claim 19, wherein the at least one processor is further configured to:
measure a metric of each of the plurality of candidate beams for communication with the base station.

24. The apparatus of claim 19, wherein the at least one processor is further configured to:
select, during the off period of the cDRX cycle, the at least one of the plurality of candidate beams for communication with the base station.

25. The apparatus of claim 19, wherein the at least one processor is further configured to:
receive a signal from the base station, wherein the signal includes a medium access control (MAC) control element (MAC-CE) indicating beam switch information; and
switch to a new UE beam for communication with the base station based on the beam switch information.

26. An apparatus for wireless communication at a base station, comprising:
a memory; and
at least one processor coupled to the memory and configured to:
configure a connected mode discontinuous reception (cDRX) cycle with a user equipment (UE);
receive a scheduling request (SR) during an off period and prior to receiving a beam report; and
receive the beam report from the UE during the off period of the cDRX cycle based on a preconfigured resource, wherein the beam report includes a comparison of a first metric of at least one of a plurality of candidate beams and a second metric of a current beam, and the beam report is received from the UE via a periodic channel state information (CSI) physical uplink control channel (PUCCH) (P-CSI PUCCH), wherein at least one of the first metric or the second metric is signal quality associated with a synchronization signal block (SSB).

27. The apparatus of claim 26, wherein the at least one processor is further configured to:
switch to the at least one of the plurality of candidate beams from the current beam, during the off period, for communication with the UE in a following on period.

* * * * *